July 1, 1930.   Q. G. NOBLITT   1,769,385
AUTOMOBILE HEATER
Filed Oct. 14, 1927
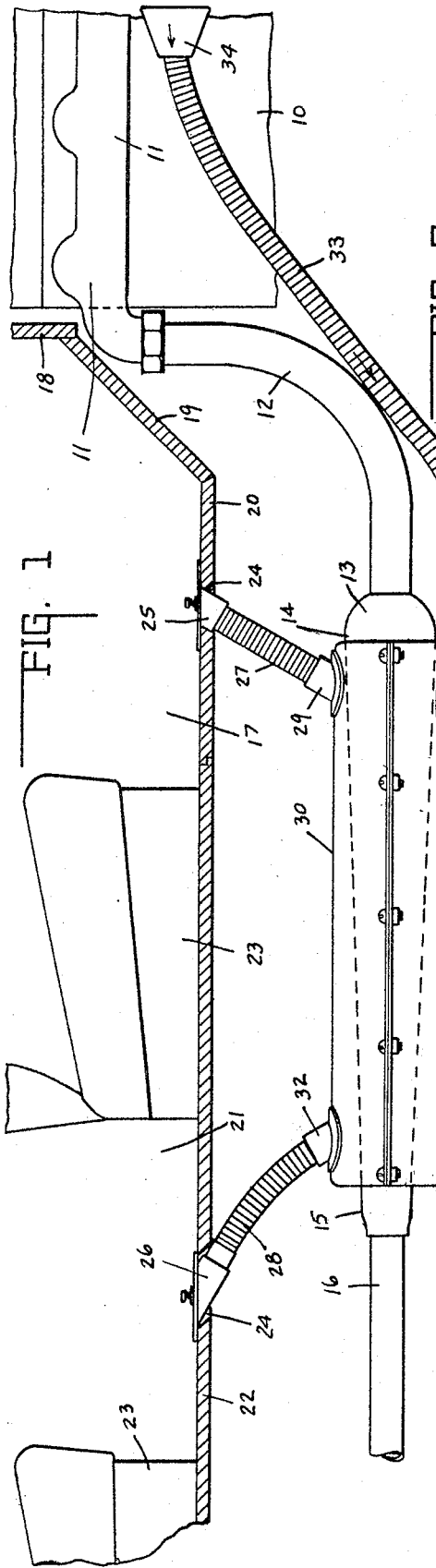
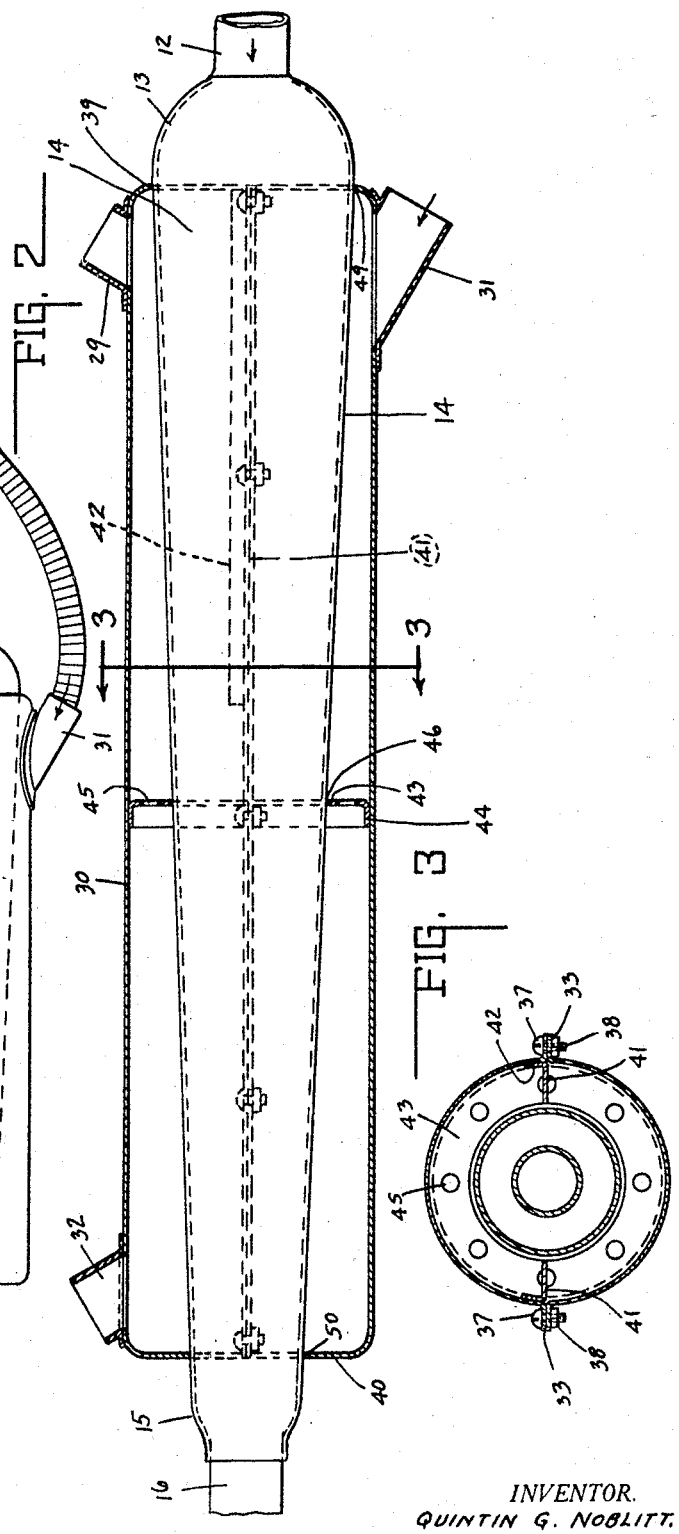
INVENTOR.
QUINTIN G. NOBLITT.
BY
ATTORNEYS.

Patented July 1, 1930

1,769,385

UNITED STATES PATENT OFFICE

QUINTIN G. NOBLITT, OF INDIANAPOLIS, INDIANA, ASSIGNOR TO INDIANAPOLIS PUMP & TUBE COMPANY, OF INDIANAPOLIS, INDIANA, A CORPORATION

AUTOMOBILE HEATER

Application filed October 14, 1927. Serial No. 226,215.

This invention relates to a heater construction.

The chief object of this invention is to provide a heater construction which is associated with an elongated conical muffler of an automobile and which heater is adapted to supply heated air to a plurality of compartments if and when desired.

The chief feature of the invention consists in the particular construction of the heater, whereby air is heated by the exhaust gases passing thru the muffler and is subsequently supplied to one or more compartments of a vehicle including the engine supplying the exhaust gases to the muffler.

The full nature of the invention will be understood from the accompanying drawings and the following description and claims:

In the drawings Fig. 1 is a central sectional view thru a portion of a motor vehicle with the engine, muffler, exhaust pipe, heater and supply and discharge conduits thereto shown in elevation. Fig. 2 is an enlarged central section thru the heater, the muffler and exhaust pipe being shown in elevation. Fig. 3 is a transverse sectional view taken on line 3—3 of Fig. 2 and in the direction of the arrows In the drawings 10 indicates an internal combustion engine having an exhaust manifold 11, an exhaust pipe 12 discharging into the bell-shaped head 13 of a conical muffler 14 which has a bell-shaped head 15 discharging through the exhaust pipe extension 16. The vehicle is shown including a front compartment 17 formed by the dash 18, toe-board 19, and floor board 20 and the rear compartment 21 having a floor board 22, said floor boards being positioned forwardly of the seats 23. Each floor board is shown apertured as at 24 and mounted therein is a regulating register (25 in the forward compartment and 26 in the rearward compartment). A conduit 27 connects the forward compartment register 25 with the heater (indicated generally by the numeral 30) and the rearward compartment register 26 is connected by the conduit 28 to said heater. The heater 30 includes an outlet or discharge 29 to which conduit 27 connects and a discharge 32 to which conduit 28 connects. An intake 31 is connected by a flexible conduit 33 to a flared mouth or funnel 34 which constitutes the air intake and the conduit 33 extends upwardly so that said funnel or intake is positioned adjacent the radiator and is supplied with relatively clean and fresh air.

The conical muffler is relatively elongated, as shown, and gradually tapers toward its discharge end.

In the present form of the invention the heater 30 is cylindrical in shape and is positioned coaxial with the conical muffler. The heater comprises a pair of semi-cylindrical shells which have a butt joint connection by means of the elongated and longitudinally extending flanges 33, said flanges being secured together by a plurality of bolts 37 and nuts 38. Other suitable fastening means may be employed. Both ends of the cylindrical casing are closed as at 39 and 40.

A pair of partition plates 41 is secured to one of the shells adjacent the edge thereof (see Fig. 3) by flanges 42. The said partition plates constitute a deflector or baffle and extend from the forward end of the heater casing toward the opposite end but terminate short of the middle thereof at a position indicated by the termination of the flanges 42 in Fig. 2.

Adjacent the termination of the deflecting baffle 41 is a diffusing plate 43 having the flange portion 44. A plurality of openings 45 permit the passage of air from the forward compartment to the rearward compartment of the heater. The plate 43 includes a central aperture 46 and the same limits the forward movement of the plate upon the muffler. The opening 46 preferably is sufficient to clear the rear end of the muffler. The partition plate is worked forwardly until it binds upon the muffler and since its external diameter is fixed by the peripheral flange 44 the same constitutes a rigid intermediate support for the cylindrical heater casing 30 when in clamped or assembled relation.

The air supplied thru the intake 31 by conduit 33 and funnel 34 passes along the underside of the forward portion of the muffler and after it becomes heated it passes rearwardly until it clears the deflecting baffle 41 and engages the transverse baffle 43. A part of the air passes thru the apertures 45 and into the rearward compartment substantially surrounding the muffler and passes outwardly to the rear compartment 21 of the vehicle by way of the outlet 32. Thus, the air passing from intake 31 to outlet 32 passes substantially the full length of the muffler. What air does not pass thru the baffle plate 43 is deflected forwardly, and upwardly since it is heated, and returns along the upper portion of the forward compartment of the heater and discharges from the outlet 29. Thus, the air discharged from outlet 29 has a path substantially equal to the full length of the muffler and the baffle plate is so arranged that the relative resistance or pressure resistance insures substantially equal distribution of the air supplied thru intake 31 to the outlets 29 and 32. By increasing or decreasing the number of holes 45 or the baffling area of the transverse baffle partition, the air distribution between the outlets may be varied, as desired.

The inturned end closures 39 and 40, centrally apertured at 49 and 50, respectively, together with the central partition 43, serve to maintain the heater casing 30 in coaxial relation to the conical muffler.

The invention claimed is:

1. In combination with an elongated tapered muffler having bell shaped ends, an air heater including a casing peripherally inclosing the said muffler and having an air intake and an air discharge, a pair of cooperating ends for said casing each including inturned annular portions centrally apertured for projection of the muffler therethrough, a longitudinal partition within said casing and extending from the forward end of the casing toward the rearward end thereof and forming a pair of superposed reverse flow communicating chambers, said air intake being in the lower chamber at the forward end thereof, and said air discharge comprising outlets at the forward and rearward ends of the upper chamber and a transverse air dividing partition interposed therebetween for insuring substantially equal distribution of the air discharge to the two outlets.

2. In combination with an elongated muffler an air heater including a casing surrounding said muffler, end members for said casing, a transverse apertured partition in said casing intermediate of said end members, a longitudinal partition in said casing extending from one end thereof toward said first mentioned partition and stopping short thereof, an air intake adjacent the end of said casing adjacent said last mentioned partition, and a pair of air outlets, one of which being positioned adjacent the before mentioned end of said casing upon the opposite side of said last mentioned partition to said air intake and the other of which being positioned adjacent the opposite end of said casing.

In witness whereof, I have hereunto affixed my signature.

QUINTIN G. NOBLITT.